(12) United States Patent
Nishimura (10) Patent No.: US 11,706,530 B2
(45) Date of Patent: Jul. 18, 2023

(54) IMAGING DEVICE, METHOD FOR CONTROLLING IMAGING DEVICE, AND NON-TRANSITORY COMPUTER-READABLE RECORDING MEDIUM STORING PROGRAM FOR CONTROLLING IMAGING DEVICE

(71) Applicant: CANON KABUSHIKI KAISHA, Tokyo (JP)

(72) Inventor: Ryutaro Nishimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/706,363

(22) Filed: Mar. 28, 2022

(65) Prior Publication Data

US 2022/0321787 A1 Oct. 6, 2022

(30) Foreign Application Priority Data

Mar. 30, 2021 (JP) ................................. 2021-058387

(51) Int. Cl.
*H04N 23/695* (2023.01)
*H04N 23/661* (2023.01)

(52) U.S. Cl.
CPC ......... *H04N 23/695* (2023.01); *H04N 23/661* (2023.01)

(58) Field of Classification Search
CPC ........................... H04N 23/695; H04N 23/661
USPC ..................................................... 348/211.9
See application file for complete search history.

(56) References Cited

U.S. PATENT DOCUMENTS

| 7,298,398 B2* | 11/2007 | Teramoto | H04N 7/183 |
| | | | 348/208.99 |
| 7,551,222 B2* | 6/2009 | Morofuji | H04N 23/673 |
| | | | 348/211.12 |
| 8,866,935 B2* | 10/2014 | Kagei | H04N 23/69 |
| | | | 348/240.3 |
| 10,742,886 B2* | 8/2020 | Gyotoku | H04N 23/6811 |
| 11,172,137 B2* | 11/2021 | Idaka | H04N 23/6812 |
| 2004/0263681 A1* | 12/2004 | Teramoto | G08B 13/1963 |
| | | | 348/E7.087 |
| 2013/0169196 A1* | 7/2013 | Markham | H02P 6/08 |
| | | | 318/3 |
| 2013/0222651 A1* | 8/2013 | Kagei | H04N 5/262 |
| | | | 348/335 |
| 2018/0309930 A1* | 10/2018 | Gyotoku | H04N 23/6812 |
| 2019/0313032 A1* | 10/2019 | Liu | G06V 20/13 |
| 2021/0176401 A1* | 6/2021 | Idaka | H04N 23/661 |

FOREIGN PATENT DOCUMENTS

| JP | H02248168 A | 10/1990 |
| JP | H04344906 A | 12/1992 |
| JP | 2000307929 A | 11/2000 |
| JP | 2008131184 A | 6/2008 |

\* cited by examiner

*Primary Examiner* — Pritham D Prabhakher
(74) *Attorney, Agent, or Firm* — Canon U.S.A., Inc. IP Division (57) ABSTRACT

An imaging device has a computer executing instructions that, when executed by the computer, cause the computer to: acquire a current position in an imaging direction of the imaging device; perform a process of controlling the imaging direction of the imaging device; and control, in a case where the imaging direction is controlled to a target position, a timing of starting a stop process for stopping controlling the imaging direction based on a speed at which the imaging direction is changed.

10 Claims, 6 Drawing Sheets

IMAGING DEVICE, METHOD FOR CONTROLLING IMAGING DEVICE, AND NON-TRANSITORY COMPUTER-READABLE RECORDING MEDIUM STORING PROGRAM FOR CONTROLLING IMAGING DEVICE

BACKGROUND

Field of the Disclosure

The present disclosure relates to a method for controlling an imaging device.

Description of the Related Art

There is a technique for controlling an imaging direction of an imaging device that captures an image. In this technique, it is important to accurately stop controlling the imaging direction to set the imaging direction to a desired position and enable the imaging device to capture an image of a place intended by a user after controlling the imaging direction.

Japanese Patent Laid-Open No. 2008-131184 describes a method for stopping outputting a drive signal to a pan motor when the rotational speed of the pan motor driven by starting outputting the drive signal to the pan motor reaches a target rotational speed.

However, according to Japanese Patent Laid-Open No. 2008-131184, processing is executed to stop controlling an imaging direction when the imaging direction reaches a target position. Therefore, when the imaging direction is controlled at a high speed and the control of the imaging direction is stopped, the change of the imaging direction may be stopped such that the imaging direction largely deviates from the target position.

SUMMARY

To provide a technique for accurately setting an imaging direction to a target position intended by a user, an imaging device according to an aspect includes: a memory storing instructions; and a processor, when executing the instructions, configured to: acquire a current position in an imaging direction of the imaging device; perform a process of controlling the imaging direction of the imaging device; and control, in a case where the imaging direction is controlled to a target position, a timing of starting a stop process of stopping controlling the imaging direction based on a speed at which the imaging direction is changed.

Further features of the present invention will become apparent from the following description of exemplary embodiments (with reference to the attached drawings).

DESCRIPTION OF THE EMBODIMENTS

Hereinafter, embodiments of the present invention are described with reference to the accompanying drawings. Configurations described below in the embodiments are merely an example and are not limited to configurations illustrated in the drawings.

First Embodiment

Figure 1:
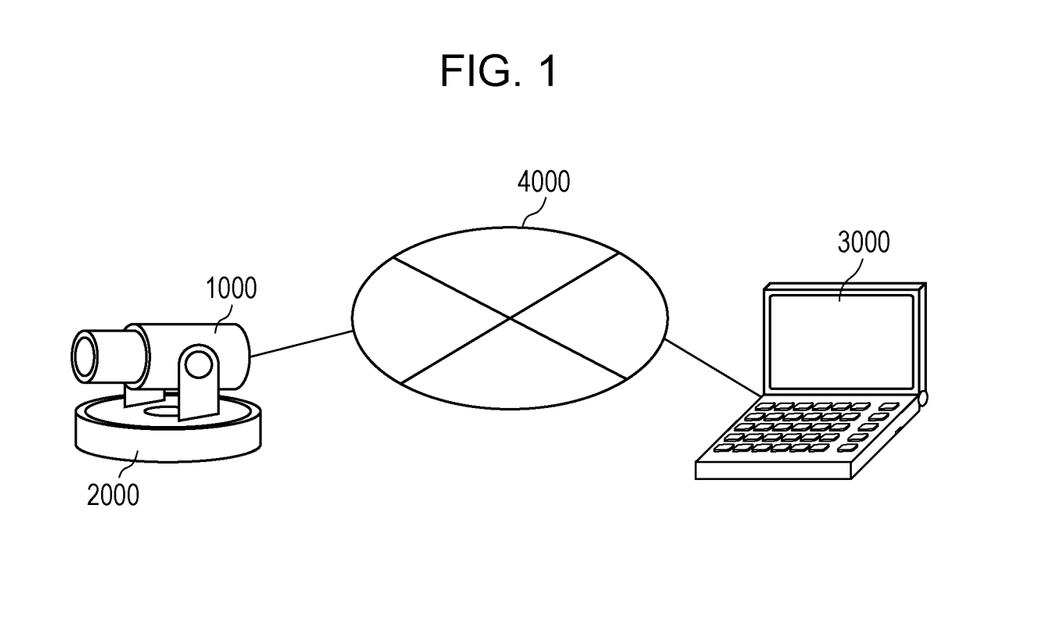
FIG. 1 is a diagram illustrating a configuration of a system.

FIG. 1 is a diagram illustrating a configuration of a system according to the first embodiment. The system according to the present embodiment includes an imaging device 1000, a camera platform 2000, a client device 3000, and a network 4000.

The imaging device 1000 and the client device 3000 are communicably connected to each other via the network 4000. The network 4000 is, for example, implemented by a plurality of routers, switches, cables, and the like that conform to a communication standard such as Ethernet (registered trademark).

The network 4000 may be implemented by the Internet, a wired local area network (LAN), a wireless LAN, a wide area network (WAN), or the like.

The imaging device 1000 can transmit captured image data or the like to the client device 3000 via the network 4000 in response to a request from the client device 3000. The imaging device 1000 may actively transmit image data or the like to the client device 3000 connected to the imaging device 1000 in advance. The client device 3000 is an information processing device that is constituted by a general terminal device such as a personal computer (PC), a smartphone, or a tablet PC. The client device 3000 controls the imaging direction of the imaging device 1000 and controls the image quality of the imaging device 1000. The client device 3000 may directly control the camera platform 2000 to control the imaging direction. The client device 3000 may be a dedicated controller or the like that controls the imaging device 1000 and the camera platform 2000. The client device 3000 may be a control device that sets and controls, for example, the focus and white balance of the imaging device 1000 and controls the camera platform 2000.

The camera platform 2000 is a device that controls the panning and tilting of the imaging device 1000 via the imaging device 1000 in response to a request from the client device 3000. Communication may be performed between the imaging device 1000 and the camera platform 2000 in accordance with RS-232C, RS-422A, RS-485, or another communication standard. RS-232C, RS-422A, and RS-485 are communication standards of the Electronic Industries Association (EIA). The imaging device 1000 and the camera platform 2000 may be disposed in the same housing. In other words, the imaging device 1000 may include a drive unit that controls the imaging direction.

Figure 2:
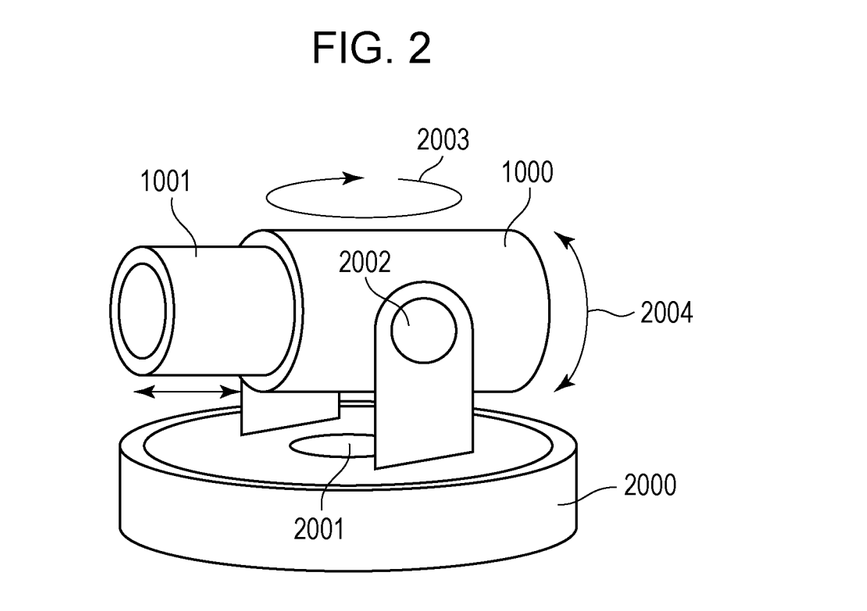
FIG. 2 is an exterior view of an imaging device.
Figure 3:
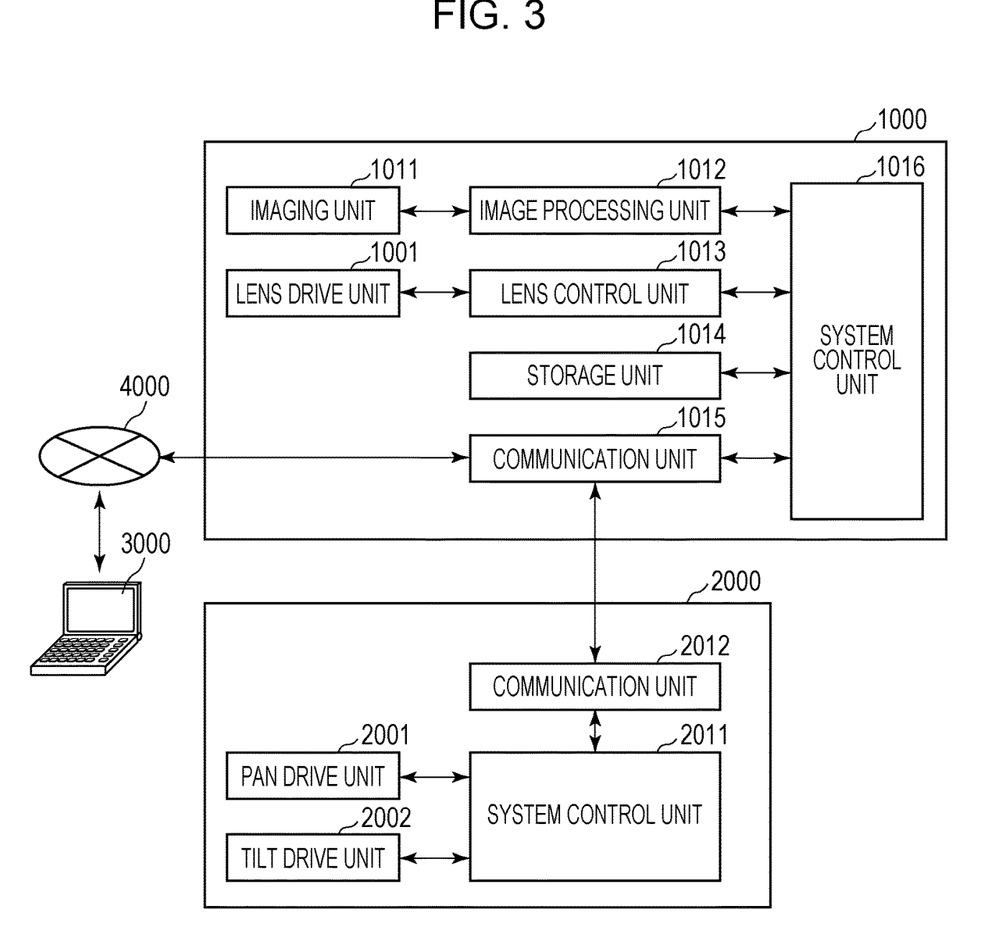
FIG. 3 is a diagram illustrating functional blocks of the imaging device and functional blocks of a camera platform.

The imaging device 1000 and the camera platform 2000 are described with reference to FIGS. 2 and 3. FIG. 2 is an exterior view of an example of the imaging device 1000 and the camera platform 2000 according to the present embodiment.

The imaging device 1000 captures an image and can change a zoom value by controlling a lens drive unit 1001. The camera platform 2000 according to the present embodiment can change the imaging direction of the imaging device 1000 in a panning direction (horizontal direction)

2003 and a tilting direction (vertical direction) 2004 by controlling a pan drive unit 2001 and a tilt drive unit 2002.

Next, functions of the imaging device 1000 and the camera platform 2000 are described with reference to FIG. 3. Among functional blocks of the imaging device 1000 according to the present embodiment, functions such as an image processing unit 1012, a lens control unit 1013, a storage unit 1014, a communication unit 1015, and a system control unit 1016 are implemented as follows. That is, the functions are implemented by causing a central processing unit (CPU) 700 (described later with reference to FIG. 7) of the imaging device 1000 to execute a computer program stored in a read only memory (ROM) 720 (described later with reference to FIG. 7) of the imaging device 1000.

An imaging unit 1011 is constituted by an imaging element (not illustrated) such as a charge-coupled device (CCD) sensor, a complementary metal-oxide-semiconductor (CMOS) sensor, or the like. The imaging unit 1011 performs photoelectric conversion on an image of a subject formed via a lens to generate an electric signal. The image processing unit 1012 generates image data by performing image processing such as processing of converting the electric signal obtained by the photoelectric conversion in the imaging unit 1011 into a digital signal and image processing such as compression coding processing. The image data generated may not be a single image data item. A plurality of image data items with different solutions or different qualities may be generated simultaneously as the image data. The image processing unit 1012 transmits the generated image data to the system control unit 1016. The lens drive unit 1001 is constituted by a drive system for driving a focus lens and a zoom lens. The operation of the lens drive unit 1001 is controlled by the lens control unit 1013. The lens control unit 1013 controls the lens drive unit 1001, based on an instruction transmitted from the system control unit 1016. The lens control unit 1013 transmits information of movement of the focus lens and information of movement of the zoom lens to the system control unit 1016.

The storage unit 1014 stores various types of setting information and the like. The system control unit 1016 analyzes a camera control command transmitted and executes processing corresponding to the camera control command. For example, the system control unit 1016 instructs the image processing unit 1012 to adjust the image quality and instructs the lens control unit 1013 to control the zoom lens and the focus lens in accordance with the camera control command acquired. In addition, the system control unit 1016 acquires the image data generated by the image processing unit 1012 and transmits the acquired image data to the communication unit 1015. The system control unit 1016 converts a panning/tilting control command received by the communication unit 1015 into a camera platform control command and transmits the camera platform control command to the communication unit 1015.

The communication unit 1015 transmits the image data transmitted from the system control unit 1016 to the client device 3000. The communication unit 1015 receives various set commands and the camera control command from the client device 3000 and transmits the set commands and the camera control command to the system control unit 1016. The communication unit 1015 transmits, to the client device 3000, a response of the imaging device 1000 to the commands transmitted from the client device 3000. The communication unit 1015 transmits, to a communication unit 2012 of the camera platform 2000, the camera platform control command transmitted from the system control unit 1016.

The pan drive unit 2001 of the camera platform 2000 includes a drive source motor and a mechanism drive system, which performs a panning operation. The pan drive unit 2001 drives the imaging device 1000 to rotate the imaging device 1000 in the panning direction 2003 and change the imaging direction of the imaging device 1000 in the panning direction 2003. The operation of the pan drive unit 2001 is controlled by a system control unit 2011. The tilt drive unit 2002 includes a drive source motor and a mechanism drive system, which performs a tilting operation. The tilt drive unit 2002 drives the imaging device 1000 to rotate the imaging device 1000 in the tilting direction 2004 and change the imaging direction of the imaging device 1000 in the tilting direction 2004. The operation of the tilt drive unit 2002 is controlled by the system control unit 2011.

The system control unit 2011 analyzes the camera platform control command transmitted and instructs the pan drive unit 2001 and the tilt drive unit 2002 to perform the panning operation and the tilting operation. The system control unit 2011 acquires current angle data of the pan drive unit 2001 and current angle data of the tilt drive unit 2002 and transmits the acquired current angle data to the communication unit 2012.

The communication unit 2012 transmits, to the system control unit 2011, the camera platform control command transmitted from the communication unit 1015 of the imaging device 1000. The communication unit 2012 receives, from the system control unit 2011, the current angle data of the pan drive unit 2001 and the current angle data of the tilt drive unit 2002. The communication unit 2012 transmits the received current angle data to the communication unit 1015 of the imaging device 1000. The imaging device 1000 and the camera platform 2000 may be disposed in the same housing. In other words, the imaging device 1000 may include the pan drive unit 2001 and the tilt drive unit 2002.

Methods for controlling the camera platform 2000 can be classified into two types, position specifying control and direction specifying control. The position specifying control specifies an angle in the panning direction and an angle in the tilting direction and controls the imaging direction to a direction defined by the specified angle in the panning direction and the specified angle in the tilting direction. The direction specifying control specifies a direction toward which the imaging direction is changed.

It is assumed that the camera platform does not support the position specifying control and supports the direction specifying control and that a request to perform the position specifying control on the camera platform to set the imaging direction to a target position is provided by a user. In this case, in the present embodiment, to set the imaging direction to the target position specified by a current position acquisition command provided by the system control unit 1016 and the direction specifying control, a stop process of stopping the direction specifying control is started when the imaging direction reaches a position separated from the target position by a braking distance according to the operational speed of the camera platform before reaching the target position. It is assumed that the camera platform operates at the maximum speed when the speed at which the imaging direction is controlled (changed) by the user is not particularly specified.

Figure 4:
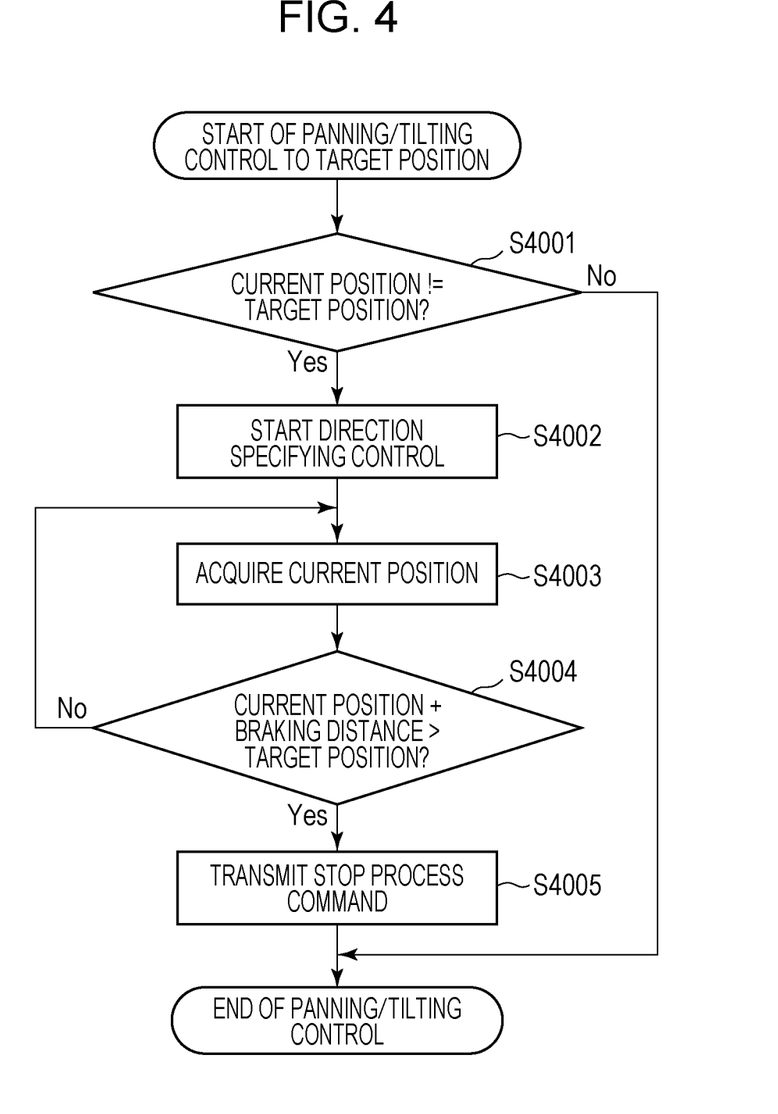
FIG. 4 is a flowchart illustrating a procedure for a stop process of stopping controlling an imaging direction.

A method for controlling the timing of starting the stop process of stopping controlling the imaging direction according to the present embodiment is described with reference to FIGS. 4, 5A, and 5B. It is assumed that a position in the panning and tilting directions that is a target position for the imaging direction is specified by the user using the client device 3000 and that information of the target position is transmitted from the client device 3000 to the imaging device 1000 via the network 4000 before a process illustrated in FIG. 4 is performed. The process illustrated in FIG. 4 is, for example, performed by the functional blocks (illustrated in FIG. 3) implemented by causing the CPU 700 of the imaging device 1000 to execute the computer program stored in the ROM 720 of the imaging device 1000.

In S4001 illustrated in FIG. 4, the system control unit 1016 acquires the current position of the camera platform 2000 in the panning and tilting directions that is held in the storage unit 1014 and has been last acquired, and determines whether the current position is equal to the target position. Even in the case where the current position and the target position do not exactly match, when the difference between the current position and the target position is smaller than a threshold, the system control unit 1016 determines that the current position is equal to the target position. When the system control unit 1016 determines that the current position is equal to the target position (No in S4001), the system control unit 1016 ends the panning/tilting control. On the other hand, when the system control unit 1016 determines that the current position is not equal to the target position (Yes in S4001), the panning/tilting control proceeds to S4002. As the current position used in S4001, a stop position stored in the storage unit 1014 and used at the time of the control previously performed may be used. In addition, as the current position used in S4001, the current position of the camera platform 2000 in the panning and tilting directions that has been acquired as a response to the current position acquisition command periodically transmitted by the system control unit 1016 to the camera platform 2000 may be used.

In S4002, the system control unit 1016 of the imaging device 1000 transmits a command to start the direction specifying control to the system control unit 2011 of the camera platform 2000 via the communication unit 1015 and the communication unit 2012. In this case, the system control unit 1016 determines directions from the current position to the target position in the panning direction and the tilting direction and transmits the command to start the direction specifying control to control the panning and the tilting in the determined directions. As the determination of the directions to the target position in the panning and tilting directions, for example, the following process is performed. That is, the system control unit 1016 determines, as the panning direction 2003, the right or left direction in which a distance from the current position to the target position is shorter. Similarly, the system control unit 1016 determines, as the tilting direction 2004, the upward or downward direction in which a distance from the current position to the target position is shorter. After that, the system control unit 1016 transmits a command to start the direction specifying control to control the imaging direction in the determined directions.

Next, in S4003, the system control unit 1016 of the imaging device 1000 transmits a current position acquisition command to request the current position of the camera platform 2000 in the panning and tilting directions to the system control unit 2011 via the communication unit 1015 and the communication unit 2012. Then, the system control unit 1016 acquires the current position transmitted from the camera platform 2000 as a response to the current position acquisition command.

Next, in S4004, the system control unit 1016 identifies, based on a braking distance function described later, a braking distance according to a current operational speed (change speed at which the imaging direction is changed) of the camera platform 2000 and determines whether the sum of the current position and the braking distance exceeds the target position. When the sum of the current position and the braking distance does not exceed the target position (No in S4004), that is, when a position obtained by adding the braking distance to the current position does not reach the target position, the panning/tilting control proceeds to S4003 and the system control unit 1016 performs the process of S4003 again. When the sum of the current position and the braking distance exceeds the target position (Yes in S4004), that is, when the position obtained by adding the braking distance to the current position reaches the target position, the panning/tilting control proceeds to S4005. Regarding the requirement used in S4004, the sum of an allowable error and the sum of the current position and the braking distance may be used. In addition, a speed specified in the command to start the direction specifying control may be stored as the operational speed of the camera platform 2000 in S4002, or the operational speed of the camera platform 2000 may be estimated from the current position used in S4001 and the current position acquired in S4003.

In S4005, the system control unit 1016 transmits a stop process command to request to stop controlling the imaging direction to the system control unit 2011 via the communication unit 1015 and the communication unit 2012. After that, the camera platform 2000 ends the panning/tilting control in response to the acquisition of the stop process command.

Figure 5A:
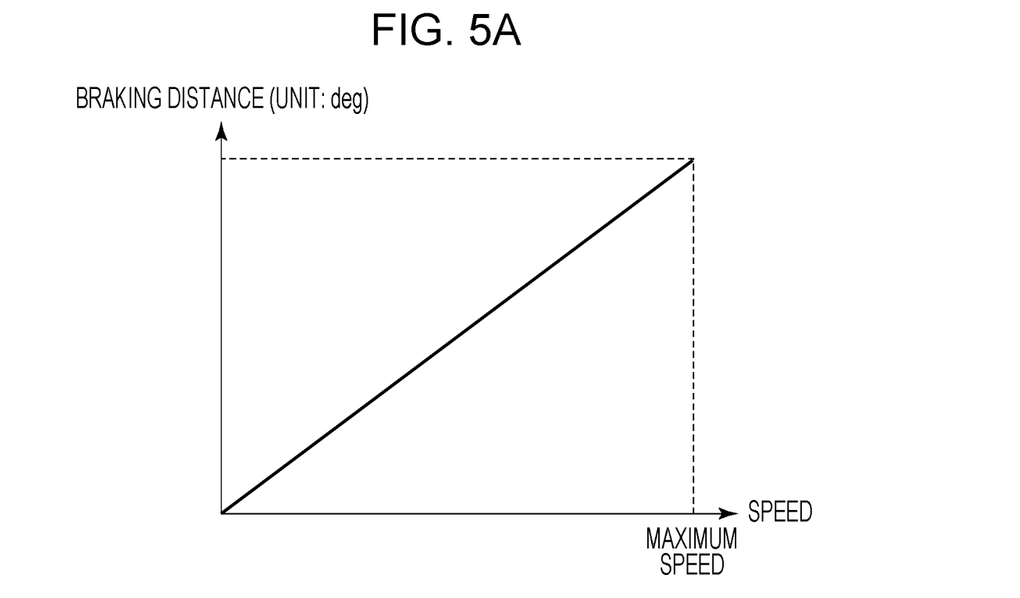
FIGS. 5A and 5B are diagrams illustrating an example of a function of a change speed and a braking distance.
Figure 5B:
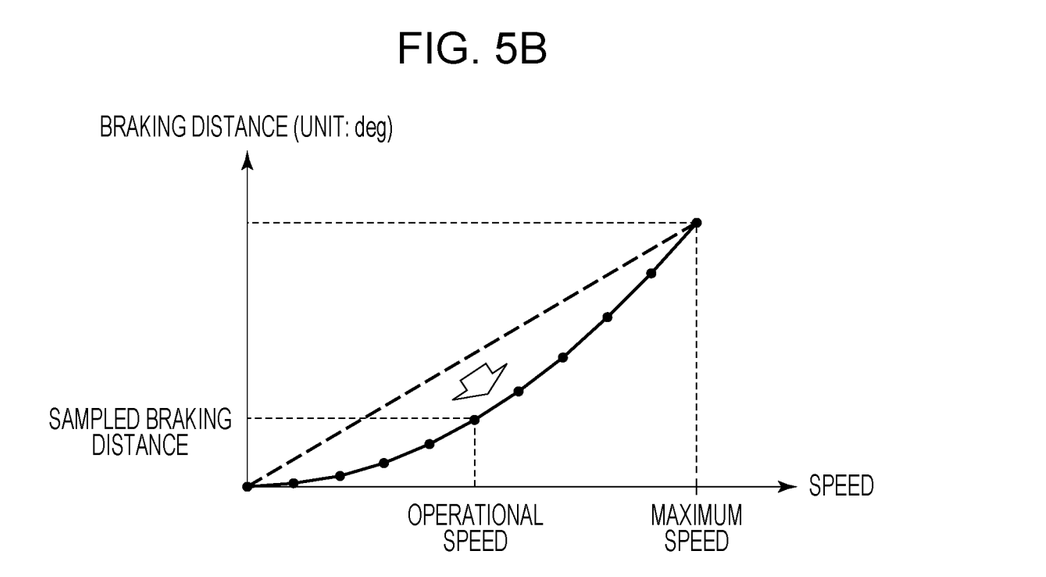

FIGS. 5A and 5B illustrate an example of a function (hereinafter referred to as braking distance function) of the braking distance according to the operational speed of the camera platform. The system control unit 1016 references the braking distance function to acquire the braking distance in S4004. As illustrated in FIG. 5A, different braking distances are given for different operational speeds (that is, speeds at which the imaging direction is changed) of the camera platform. For example, the higher the operational speed (speed at which the imaging direction is changed) of the camera platform, the larger the value of the braking distance. On the other hand, the lower the operational speed (speed at which the imaging direction is changed) of the camera platform, the smaller the value of the braking distance. That is, a first braking distance is given for a first change speed at which the imaging direction is changed. A second braking distance that is longer than the first braking distance is given for a second change speed at which the imaging distance is changed. The second change speed is higher than the first change speed. To acquire the braking distance function, as illustrated in FIG. 5A, a table indicating the relationship between the operational speed of the camera platform and the braking distance may be stored in the storage unit 1015 in advance and may be referenced by the system control unit 1016 in S4004. When the camera platform attached to the imaging device or a lens attached to the imaging device is replaced, the system control unit 1016 may sample the braking distance required for the operational speed of the camera platform and dynamically update the function table as illustrated in FIG. 5B. In this case, for example, when the system control unit 1016 controls the imaging direction at the first change speed, the system control unit 1016 identifies a distance by which the imaging direction is changed from the time of the transmission of a stop command to the time when the change of the imaging direction is stopped, and samples the identified distance as a braking distance according to the first change speed.

Similarly, the system control unit 1016 may sample braking distances according to different change speeds such as the second change speed and a third change speed to generate a new braking distance function as illustrated in FIG. 5B. As the braking distance function stored in the storage unit 1015, braking distance functions different for the panning direction 2003 and the tilting direction 2004 may be held in the storage unit 1015. In this case, the system control unit 1016 references the braking distance function for the panning direction 2003 and identifies a braking distance according to the current speed at which the imaging direction is changed in the panning direction 2003. In addition, the system control unit 1016 references the braking distance function for the tilting direction 2004 and identifies a braking distance according to the current speed at which the imaging direction is changed in the tilting direction 2004.

As the braking distance function, braking distance functions different for the right and left directions in the panning direction 2003 and braking distance functions different for the upward and downward directions in the tilting direction 2004 may be held.

The imaging device according to the present embodiment identifies a braking distance according to the speed at which the imaging direction is changed during the control of the imaging direction of the imaging device to a target position, and performs the stop process of stopping controlling the imaging direction when the imaging direction reaches a position separated from the target position by the identified braking distance before reaching the target position. The imaging device according to the present embodiment controls the timing of starting the stop process of stopping controlling the imaging direction. For example, in the case where the stop process of stopping controlling the imaging direction is performed when the imaging direction reaches the target position, the transmission of a command to stop the control may be delayed, it may take a certain time from the start of the stop process to the time when the change of the imaging direction is stopped, and the change of the imaging direction may be stopped such that the imaging direction largely deviates from the target position. On the other hand, according to the present embodiment, the braking distance according to the speed at which the imaging direction is changed is identified, the stop process is performed when the imaging direction reaches a position separated from the target position by the braking distance before reaching the target position, and thus it is possible to solve the above problems.

In addition, it is assumed that communication between the camera platform and the imaging device is slow and that it takes time to transmit and receive a command to control the camera platform and acquire the current position of the camera platform in the case where the imaging direction of the imaging device is controlled by the camera platform. In this case, when the stop process of stopping controlling the imaging direction is performed when the imaging direction reaches the target position, it may take time to stop controlling the imaging direction from the time of the start of the stop process due to a delay in the transmission and reception of the command to stop controlling the imaging direction, and the change of the imaging direction may be stopped such that the imaging direction largely deviates from the target position. However, as described above, according to the present embodiment, it is possible to solve this problem. That is, according to the present embodiment, it is possible to accurately stop controlling the imaging direction to set the imaging direction to the target position intended by the user.

Second Embodiment

In the second embodiment, when a stop position is different from a target position, the speed at which an imaging direction is changed is changed and the imaging direction is controlled to the target position again. Parts different from the first embodiment are mainly described in the second embodiment. Components and processes that are the same as or similar to those described in the first embodiment are indicated by the same reference signs as those described in the first embodiment, and duplicate descriptions will be omitted.

Figure 6:
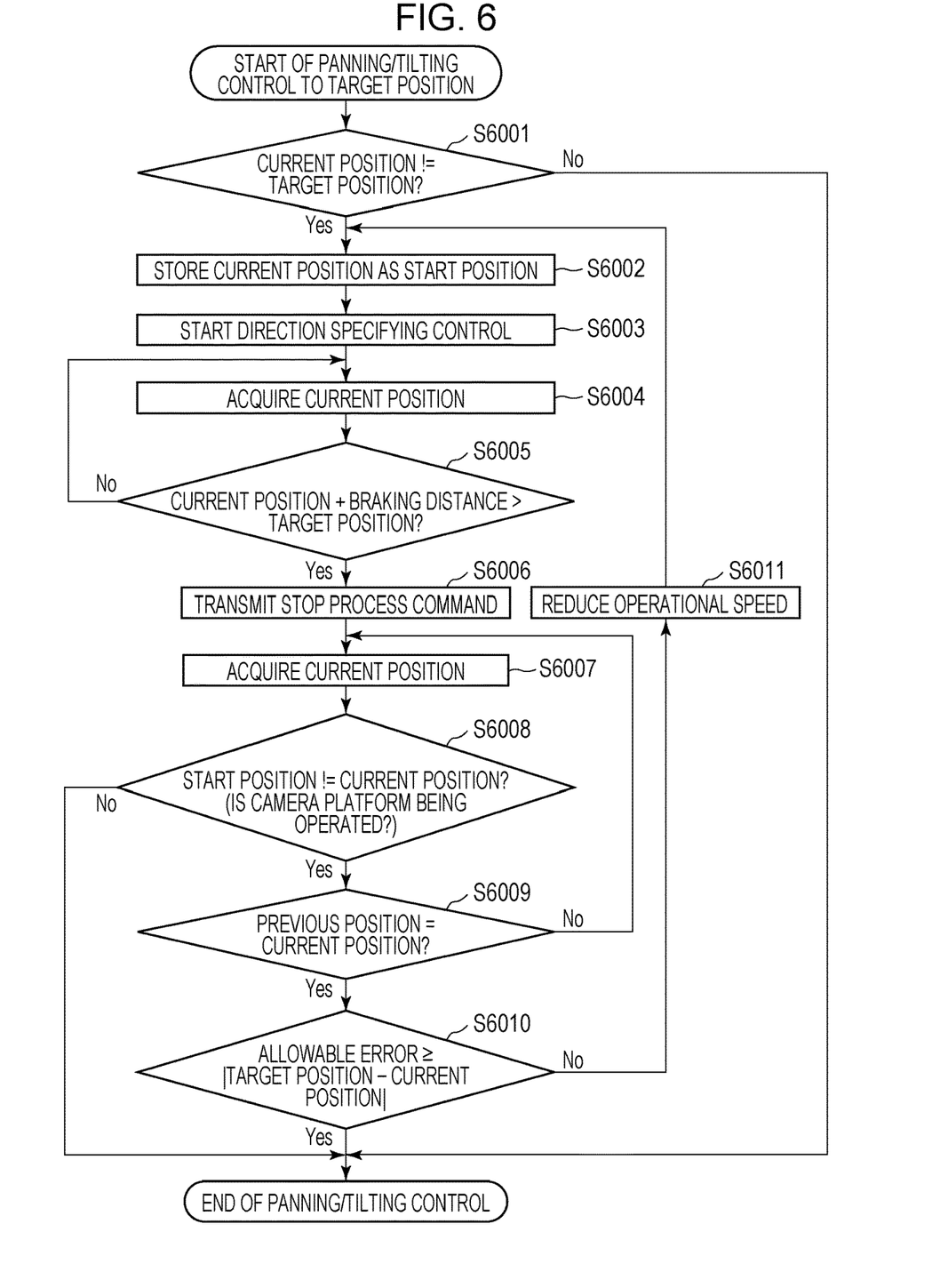
FIG. 6 is a flowchart illustrating a procedure for a stop process of stopping controlling an imaging direction.

FIG. 6 is a flowchart illustrating a procedure for a stop process of stopping controlling the imaging direction according to the present embodiment.

The process of the flowchart illustrated in FIG. 6 is, for example, performed by the functional blocks (illustrated in FIG. 3) implemented by causing the CPU 700 of the imaging device 1000 to execute the computer program stored in the ROM 720 of the imaging device 1000.

In S6001, the system control unit 1016 acquires the last acquired current position of the camera platform 2000 in the panning and tilting directions that is held in the storage unit 1014, and determines whether the current position is equal to a target position. Even in the case where the current position and the target position do not exactly match, when the difference between the current position and the target position is smaller than a threshold, the system control unit 1016 determines that the current position is equal to the target position. When the system control unit 1016 determines that the current position is equal to the target position (No in S6001), the system control unit 1016 ends the panning/tilting control. On the other hand, when the system control unit 1016 determines that the current position is not equal to the target position (Yes in S6001), the panning/tilting control proceeds to S6002. In S6002, the system control unit 1016 causes the current position in the panning and tilting directions to be stored as a start position in the storage unit 1014. The process of S6003 to S6006 is the same as that of S4002 to S4005 described in the first embodiment and the description thereof is omitted.

In S6007, the system control unit 1016 transmits a current position acquisition command to the system control unit 2011 via the communication unit 1015 and the communication unit 2012. After S6007, the panning/tilting control proceeds to S6008. In S6008, the system control unit 1016 acquires, from the storage unit 1014, the start position at which the panning and tilting operations are performed, and determines whether the camera platform 2000 is being moved from the start position. When the start position is equal to the current position, the system control unit 1016 determines that the camera platform 2000 is not being moved by the direction specifying control, and ends the panning/tilting control. When the start position is different from the current position, the panning/tilting control proceeds to S6009. Even in the case where the current position and the target position do not exactly match, when the difference between the start position and the current position is smaller than a predetermined value, the system control unit 1016 determines that the start position is equal to the target position.

Next, in S6009, the system control unit 1016 acquires the previous position from the storage unit 1014 and determines whether the camera platform 2000 has been completely stopped. When the previous position is different from the current position, the system control unit 1016 determines that the camera platform 2000 is being operated to stop and the panning/tilting control proceeds to S6007. When the previous position is equal to the current position, the system control unit 1016 determines that the operation of the camera platform 2000 has been stopped and the panning/tilting control proceeds to S6010. Even in the case where the current position and the previous position do not exactly match, when the difference between the previous position and the current position is smaller than a predetermined value, the system control unit 1016 determines that the previous position is equal to the current position.

Next, in S6010, the system control unit 1016 acquires information of an allowable error from the storage unit 1014 and determines whether the difference between the current position of the camera platform 2000 and the target position is equal to or smaller than the allowable error. When the difference between the current position and the target position exceeds the allowable error (No in S6010), the panning/tilting control proceeds to S6011. When the difference between the current position and the target position is equal to or smaller than the allowable error (Yes in S6010), the system control unit 1016 ends the panning/tilting control.

In S6011, the system control unit 1016 changes the operational speed of the camera platform 2000 to a speed lower than a currently set operational speed. After S6011, the panning/tilting control proceeds to S6002. The operational speed may be determined after the operational speed is changed every time the loop is performed a predetermined number of times. Alternatively, the operational speed at the time of the direction specifying control previously performed may be reduced in geometric progression based on the number of times that the loop is performed. In addition, the maximum number of times that the loop is performed may be determined.

In the present embodiment, even in the case where the stop position is different from the target position during the panning and tilting operations performed using the direction specifying control until the imaging direction reaches the target position, the operational speed of the camera platform is changed, and the stop process is started when the imaging direction reaches a position separated from the target position by a braking distance according to the operational speed after the change before reaching the target position. By performing the stop process in this manner, it is possible to improve the accuracy of stopping controlling the imaging direction to set the imaging direction to the target position intended by the user.

OTHER EMBODIMENTS

Figure 7:
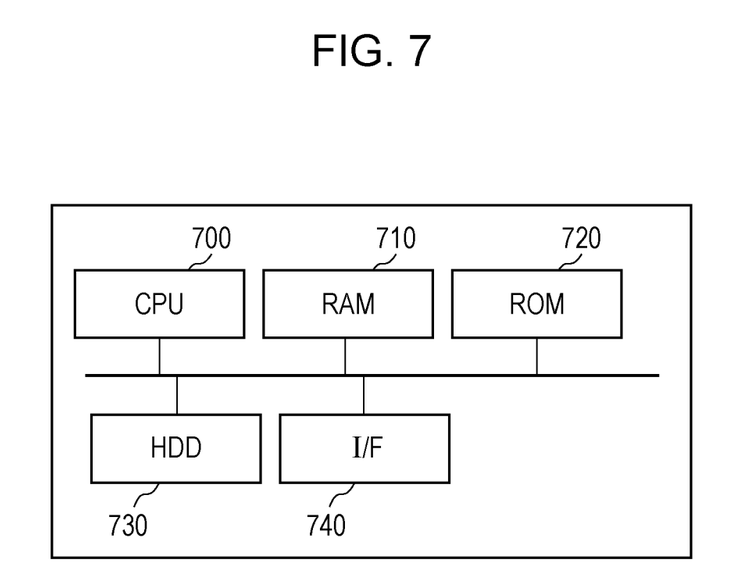
FIG. 7 is a diagram illustrating a hardware configuration of an imaging device.

Next, a hardware configuration of the imaging device 1000 that implements the functions described above in the embodiment is described with reference to FIG. 7. Although the hardware configuration of the imaging device 1000 is described below, it is assumed that the camera platform 2000 and the client device 3000 are implemented by the same hardware configuration as that of the imaging device 1000.

The imaging device 1000 according to the present embodiment includes the CPU 700, a RAM 710, the ROM 720, an HDD 730, and an I/F 740.

The CPU 700 is a central processing unit that comprehensively controls the imaging device 1000. The RAM 710 temporarily stores the computer program to be executed by the CPU 700. The RAM 710 provides a work area to be used by the CPU 700 to execute processing. The RAM 710 functions as a frame memory and functions as a buffer memory, for example.

The ROM 720 stores the program to be executed by the CPU 700 to control the imaging device 1000. The HDD 730 is a storage device in which image data and the like are recorded.

The I/F 710 communicates with an external device via the network 4000 according to the TCP/IP, the HTTP, and the like.

Although the embodiments describe the example in which the CPU 700 performs the processes, dedicated hardware may perform at least some of the processes of the CPU 700. For example, a process of reading a program code from the ROM 720 and loading the program code into the RAM 710 may be performed by direct memory access (DMA) functioning as a transfer device.

The present invention can be implemented by one or more processors reading and executing a program that implements one or more of the functions described in the embodiments. The program may be supplied to a system or a device that includes the one or more processors via the network or a storage medium.

In addition, the present invention can be implemented by a circuit (for example, an ASIC) that implements one or more of the functions described in the embodiments. The units of the imaging device 1000 may be implemented by the hardware illustrated in FIG. 7 or may be implemented by software.

One or more of the functions of the imaging device 1000 according to the embodiments may be included in another device.

Although the present invention is described above together with the embodiments, the embodiments are merely specific examples and do not limit the technical scope of the present invention. That is, the present invention can be implemented in various forms without departing from the technical idea of the present invention and the main features of the present invention. For example, a combination of the embodiments is included in the disclosed contents of the present specification.

According to the embodiments, it is possible to set the imaging direction to a target position intended by a user.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-058387 filed Mar. 30, 2021, which is hereby incorporated by reference herein in its entirety.

What is claimed is:

1. An imaging device comprising:
a memory storing instructions; and
a processor, when executing the instructions, configured to:
acquire a current position in an imaging direction of the imaging device;
perform a process of controlling the imaging direction of the imaging device; and
control, in a case where the imaging direction is controlled to a target position, a timing of starting a stop process of stopping controlling the imaging direction based on a speed at which the imaging direction is changed.

2. The imaging device according to claim 1, wherein the processor is configured to control the timing of starting the stop process based on (a) the acquired current position in the imaging direction, (b) a braking distance according to the change speed, and (c) the target position.

3. The imaging device according to claim 2, wherein the processor is further configured to:
identify a braking distance according to the current change speed based on a function of (a) the speed at which the imaging direction is changed and (b) the braking distance; and
control the timing of starting the stop process based on the identified braking distance, the current position in the imaging direction, and the target position.

4. The imaging device according to claim 3, wherein the processor is configured to identify the braking distance according to the current change speed based on (a) a function of a speed at which the imaging direction is changed in a panning direction and a braking distance in the panning direction, and (b) a function of a speed at which the imaging direction is changed in a tilting direction and a braking distance in the tilting direction.

5. The imaging device according to claim 3, wherein the processor is further configured to generate the function newly by identifying, for different speeds at which the imaging direction is changed, distances to positions where the change of the imaging direction is stopped.

6. The imaging device according to claim 2, wherein the processor is further configured to start the stop process when a position obtained by adding a braking distance according to the change speed to the current position in the imaging direction reaches the target position.

7. The imaging device according to claim 1, wherein the processor is further configured to reduce the change speed and perform the process of controlling the imaging direction to the target position again in a case where a difference between the target position and a stop position after the controlling the imaging direction is stopped by the stop process exceeds an allowable error.

8. The imaging device according to claim 1, wherein the processor is further configured to control the timing to start the stop process by transmitting a command to request to stop controlling the imaging direction to a camera platform having a drive unit that changes the imaging direction.

9. A method for controlling an imaging device, comprising:
acquiring a current position in an imaging direction of the imaging device;
performing a process of controlling the imaging direction of the imaging device; and
controlling, in a case where the imaging direction is controlled to a target position, a timing of starting a stop process for stopping controlling the imaging direction based on a speed at which the imaging direction is changed.

10. A non-transitory computer-readable recording medium storing a program for controlling an imaging device having a computer executing instructions that, when executed by the computer, cause the computer to:
acquire a current position in an imaging direction of the imaging device;
perform a process of controlling the imaging direction of the imaging device; and
control, in a case where the imaging direction is controlled to a target position, a timing of starting a stop process for stopping controlling the imaging direction based on a speed at which the imaging direction is changed.

* * * * *